United States Patent
Lee

(10) Patent No.: US 8,106,969 B2
(45) Date of Patent: Jan. 31, 2012

(54) DEVICE AND METHOD FOR REMOVING GRID NOISE

(75) Inventor: Ho-Young Lee, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 884 days.

(21) Appl. No.: 12/159,384

(22) PCT Filed: May 26, 2006

(86) PCT No.: PCT/KR2006/002022
§ 371 (c)(1),
(2), (4) Date: Jun. 26, 2008

(87) PCT Pub. No.: WO2007/074958
PCT Pub. Date: Jul. 5, 2007

(65) Prior Publication Data
US 2008/0303953 A1    Dec. 11, 2008

(30) Foreign Application Priority Data
Dec. 29, 2005  (KR) .......................... 10-2005-0132984

(51) Int. Cl.
*H04N 5/217* (2006.01)
(52) U.S. Cl. .......................... 348/241; 348/607; 358/463
(58) Field of Classification Search .......... 348/241–251, 348/607; 358/463
See application file for complete search history.

(56) References Cited

U.S. PATENT DOCUMENTS

| | | | | |
|---|---|---|---|---|
| 6,526,181 | B1 * | 2/2003 | Smith et al. | 382/275 |
| 7,855,738 | B2 * | 12/2010 | Kobayashi | 348/241 |
| 2003/0016295 | A1 | 1/2003 | Nakakuki | |

FOREIGN PATENT DOCUMENTS

| | | |
|---|---|---|
| EP | 1 585 343 A2 | 10/2005 |
| JP | 2002-77930 A | 3/2002 |
| JP | 2003-32695 A | 1/2003 |
| JP | 2005-72786 A | 3/2005 |

* cited by examiner

*Primary Examiner* — Darryl J Collins
(74) *Attorney, Agent, or Firm* — Birch, Stewart, Kolasch & Birch, LLP

(57) ABSTRACT

A device and a method for removing grid noises are disclosed. The device for removing grid noises in accordance with an embodiment of the present invention calculates an average value of each line of an inputted Bayer pattern image, calculates an estimate value estimating an average of even number lines placed between the odd number lines of a Bayer pattern image and odd number lines placed between the even number lines of a Bayer pattern image, calculates a difference value between the estimate value and the average value, calculates a correction coefficient by using the difference value, and applies the correction coefficient to the Bayer pattern image and outputs a corrected Bayer pattern image.

9 Claims, 8 Drawing Sheets

| 2 |   | 8 |   | 2 |
|---|---|---|---|---|
|   | −9|   | −9|   |
| 2 |   | 8 |   | 2 |
|   | −9|   | −9|   |
| 2 |   | 8 |   | 2 |

.x

| G3 |    | G8 |    | G13 |
|----|----|----|----|-----|
|    | G5 |    | G10|     |
| G2 |    | G7 |    | G12 |
|    | G4 |    | G9 |     |
| G1 |    | G6 |    | G11 |

SUMi

FIG. 10

|   |     |   |     |   |
|---|-----|---|-----|---|
| 7 |     | 7 |     | 7 |
|   | −32 |   | −32 |   |
| 28|     | 28|     | 28|
|   | −32 |   | −32 |   |
| 7 |     | 7 |     | 7 |

|   |    |   |    |   |
|---|----|---|----|---|
| 1 |    | 1 |    | 1 |
|   | −3 |   | −3 |   | −3 |
| 4 |    | 4 |    | 4 |
|   | −4 |   | −4 |   | −4 |
| 3 |    | 3 |    | 3 |
|   | −1 |   | −1 |   | −1 |

/48

DEVICE AND METHOD FOR REMOVING GRID NOISE

CROSS-REFERENCE TO RELATED APPLICATIONS

This application claims foreign priority benefits under 35 U.S.C. .sctn. 119(a)-(d) to PCT/KR2006/002022, filed May 26, 2006, which is hereby incorporated by reference in its entirety.

BACKGROUND

1. Technical Field

The present invention is directed to a device and method for removing grid noises, more specifically to a device and method for removing grid noises in an image processing system.

2. Description of the Related Art

It is common that grid noises occur during a color interpolation process in a Bayer pattern image inputted to an image processing system, due to a difference in line values of Gr (reddish green) and Gb (bluish green). This is described below with reference to the accompanying drawing.

FIG. 1 shows an example of average values of green pixels of a typical Bayer pattern image in the horizontal direction.

It can be seen in the drawing that there are substantial differences in average values of green pixels in the horizontal direction between even lines and odd lines. These differences cause grid noises through color interpolation, as shown in FIG. 2, which shows an example of grid noises occurred by color interpolation in a conventional image processing system.

A gaussian filter or a median filter has been conventionally used in order to remove these noises. Although these filters were able to remove the grid noises, they also damaged image details (e.g. the high-frequency edge or boundary). In other words, it has been practically impossible for the method of removing grid noises by use of a conventional filter to remove the grid noises while preserving the image details.

SUMMARY

In order to solve the problems described above, the present invention provides a device and method for removing grid noises that remove the grid noises without damaging the image by use of the difference in average values between even lines and odd lines if the center pixel in a mask is green.

Other objects of the present invention will become more apparent through the embodiments described below.

To achieve the above objects, an aspect of the present invention features a device for removing grid noises.

The device for removing grid noises in accordance with an embodiment of the present invention can have an average value calculation unit for calculating an average value of each line of an inputted Bayer pattern image, an estimation unit for calculating an estimate value estimating an average of even number lines placed between the odd number lines of a Bayer pattern image and odd number lines placed between the even number lines of a Bayer pattern image, a difference calculation unit for calculating a difference value between the estimate value calculated by the estimation unit and the average value calculated by the average value calculation unit, and a correction coefficient calculation unit for calculating a correction coefficient by using the difference value generated by the difference calculation unit.

Here, it is preferable that the device also have a correction unit for applying the correction coefficient to the Bayer pattern image and outputting a corrected Bayer pattern image.

It is preferable that the correction coefficient obtained by the correction coefficient calculation unit is what an average of the difference value, calculated by the difference calculation unit, is divided by two. The correction coefficient can be determined for each green element of a Bayer pattern image.

The correction unit can subtract a correction coefficient of each green element from each green element of a Bayer pattern image for odd number lines, and can add a correction coefficient of each green element to each green element of a Bayer pattern image for even number lines.

To achieve the above objects, another aspect of the present invention features a method of removing grid noises.

In the method of removing grid noises in accordance with an embodiment of the present invention, an average value of each line of an inputted Bayer pattern image can be calculated; an estimate value estimating an average of even number lines placed between the odd number lines of a Bayer pattern image and odd number lines placed between the even number lines of a Bayer pattern image can be calculated; a difference value between the estimate value and the average value can be calculated; a correction coefficient by using the difference value can be calculated; and the correction coefficient to the Bayer pattern image can be applied, and a corrected Bayer pattern image can be outputted.

BRIEF DESCRIPTION OF THE DRAWINGS

FIG. 5 illustrates how a correction coefficient generation unit generates correction coefficients;

FIG. 10 is an example illustrated to show the optimization of a correction coefficient obtained in accordance with the present invention; and FIG. 11 shows an example of a correction coefficient obtained from a 6×6 mask in accordance with an embodiment of the present invention.

DETAILED DESCRIPTION

Figure 1:
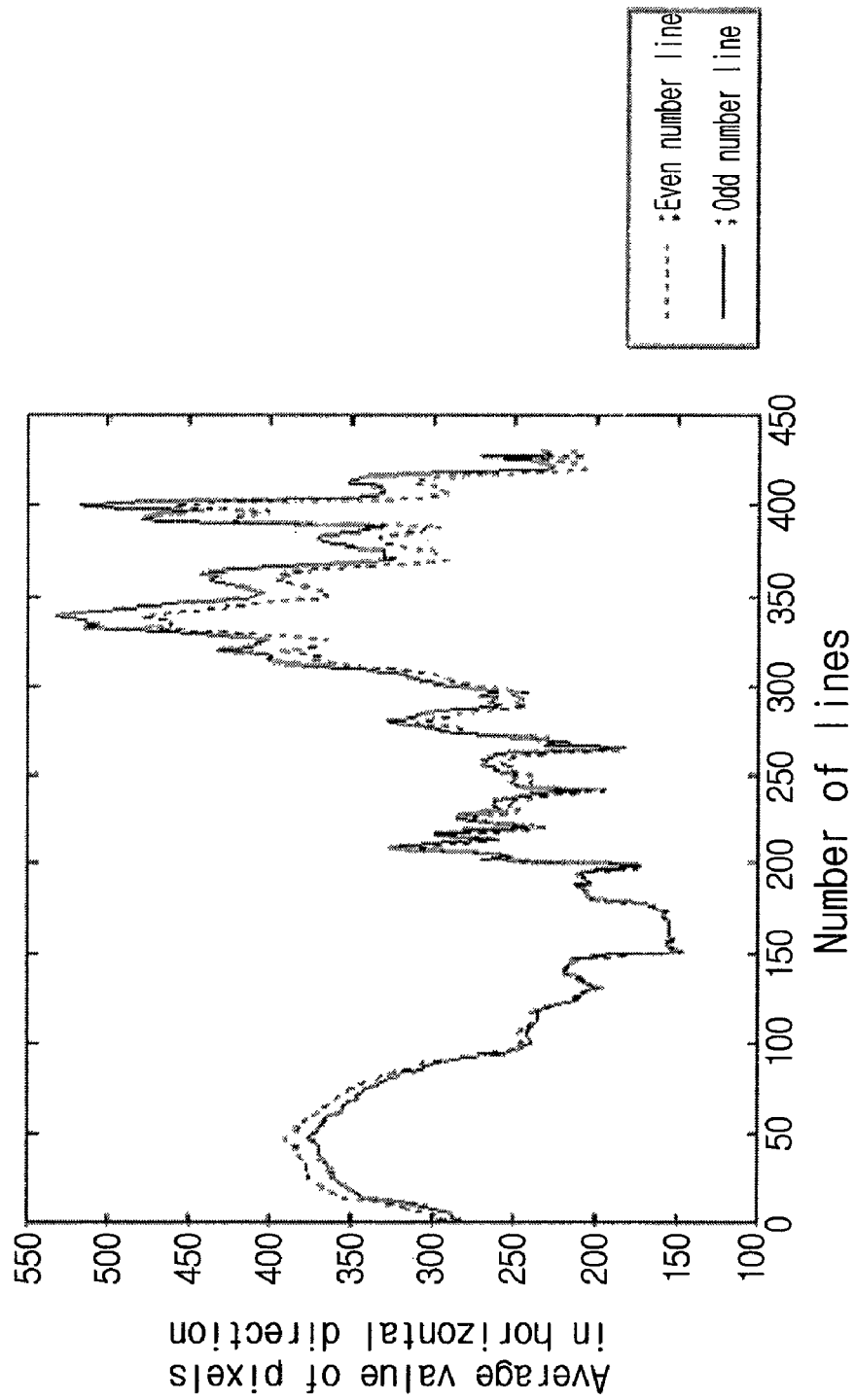
FIG. 1 shows an example of average values of green pixels of a typical Bayer pattern image in the horizontal direction.

The above objects, features, and advantages will become more apparent through the following description with reference to the accompanying drawings. It should be noted that identical elements in the drawings are given the same reference numerals regardless of the figure number. Below, an embodiment of the present invention will be described with reference to the accompanying drawings.

Figures 2, 3:
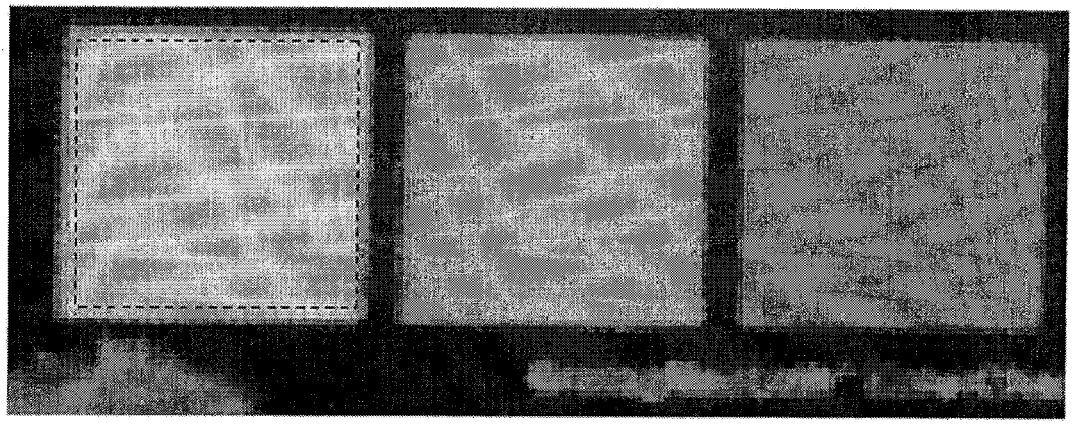
FIG. 2 shows an example of grid noises occurred by color interpolation in a conventional image processing system.
FIG. 3 shows an example of a mask of a Bayer pattern image inputted to a removal device of the present invention.

FIG. 3 is an example illustrating a mask of a Bayer pattern image inputted to the device of the present invention. The present invention is applied to a 5×5 mask, such as the one shown in FIG. 3, whose center pixel is green. Although a 5×5 mask is used as an example for the convenience of description, the invention is by no means restricted to 5×5 masks.

Figure 4:
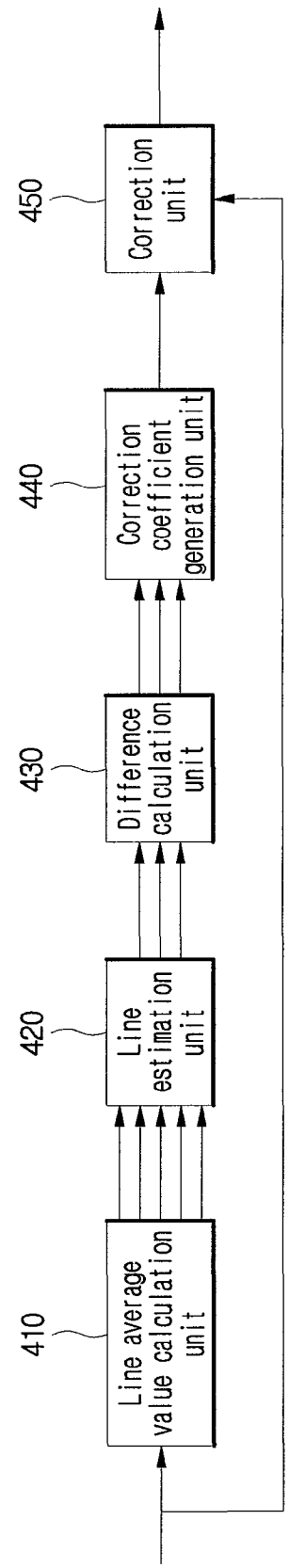
FIG. 4 shows the stnicture of a device for removing grid noises in accordance with an embodiment of the present invention.

FIG. 4 is the structure of a device for removing grid noises in accordance with an embodiment of the present invention.

As shown in the drawing, the device for removing grid noises in accordance with the present invention comprises a line average value calculation unit 410, a line estimation unit 420, a difference calculation unit 430, a correction coefficient generation unit 440, and a correction unit 450.

The line average value calculation unit 410 calculates the average value of each line of an inputted Bayer pattern image shown in FIG. 3. The average value of each line is calculated through one of the following equations:

$$\frac{G1+G2+G2}{3} \qquad [\text{EQ. 1}]$$

$$\frac{G4+G5}{2} \qquad [\text{EQ. 2}]$$

$$\frac{G6+G7+G8}{3} \qquad [\text{EQ. 3}]$$

$$\frac{G9+G10}{2} \qquad [\text{EQ. 4}]$$

$$\frac{G11+G12+G13}{3} \qquad [\text{EQ. 5}]$$

Using the average value of each line, the line estimation unit 420 estimates the average values between the lines. That is, a second line is estimated using the average values of pixels for a first and third lines, the third line using the average values of pixels for the second and a fourth lines, and the fourth line using the average values of pixels for the third and fifth lines. This is to estimate a line placed between lines because differences in average value occur, as shown in FIG. 1, since even number lines (or odd number lines) do not have information on odd number lines (or even number lines).

By averaging the differences between the estimate values obtained through the above steps and the average values calculated by the line average value calculation unit 410, and dividing this average by two, a value corresponding to a half of the gap between the even number lines and odd number lines of FIG. 1 will be obtained. Further description regarding this will follow later.

The estimate values of the second, third, and fourth lines, estimated by the line estimation unit 420, are shown in the following EQS. 6-8. Estimation by the line estimation unit 420 is carried out by calculating the average of two lines.

$$\frac{G1+G2+G3-G6+G7+G8}{6} \qquad [\text{EQ. 6}]$$

$$\frac{G4+G5+G9+G10}{4} \qquad [\text{EQ. 7}]$$

$$\frac{G6+G7+G8+G11+G12+G13}{6} \qquad [\text{EQ. 8}]$$

Referring back to FIG. 4; the difference calculation unit 430 calculates differences between the estimate values obtained by the line estimation unit 420 and the average values obtained by the line average value calculation unit 410.

In other words, the differences between the even number line graph and the odd number line graph, shown in FIG. 1, are obtained. Therefore, the differences obtained by the difference calculation unit 430 are as follows:

$$\frac{G1+G2+G3+\frac{G6+G7+G8}{6} - \frac{G4+G5}{2} = \frac{2\times\left(\begin{array}{c}G1+G2+G3+\\G6+G7+G8\end{array}\right)-6\times(G4+G5)}{12} \qquad [\text{EQ. 9}]$$

$$\frac{G6+G7+G8+\frac{G9+G10}{3} - \frac{G4+G5+G9+G10}{4} = \frac{4\times(G6+G7+G8)-3\times(G4+G5+G9+G10)}{12} \qquad [\text{EQ. 10}]$$

$$\frac{G6+G7+G8+\frac{G11+G12+G13}{6} - \frac{G9+G10}{2} = \frac{2\times\left(\begin{array}{c}G6+G7+G8+\\G11+G12+G13\end{array}\right)-6\times(G4+G5)}{12} \qquad [\text{EQ. 11}]$$

Here, the even number lines are applied with the calculation of (estimate value)−(average value), and the odd number lines are applied with the calculation of (average value)−(estimate value), because the even number lines, shown in FIG. 1, usually have smaller average values than estimate values while the odd number lines usually have greater average values than estimate values. Thus, during the application of a correction coefficient later, subtraction is performed for odd number lines while addition is performed for even number lines.

The correction coefficient generation unit 440 of FIG. 4 generates the correction coefficient α, to be applied to the Bayer pattern image, by using the differences obtained through EQS. 9-11. The correction coefficient α, shown in FIG. 12, is a half of the average value obtained through EQS. 9-11.

$$\alpha = \frac{\begin{array}{c}2G1-2G2+2G3-9G4-9G5+8G6+8G7-\\8G8-9G9-9G10+2G11+2G12+2G13\end{array}}{12\times 3\times 2} \qquad [\text{EQ. 12}]$$

Rendered graphically of this equation is FIG. 5, which illustrates how the correction coefficient generation unit generates the correction coefficient. As shown in the drawing, the correction coefficient can be generated by multiplying a constant to the 5×5 mask of a Bayer pattern, shown in FIG. 3. In the drawing, ".X" indicates a multiplication of elements that are at the same location.

The correction unit 450 applies the correction coefficient α, calculated as described above, to an input Bayer pattern image to remove grid noises. In other words, the correction unit 450 adds or subtracts the finally-obtained correction coefficient α to or from the green elements of the Bayer pattern shown in FIG. 3. This is further described below with reference to FIG. 6.

Figure 6:
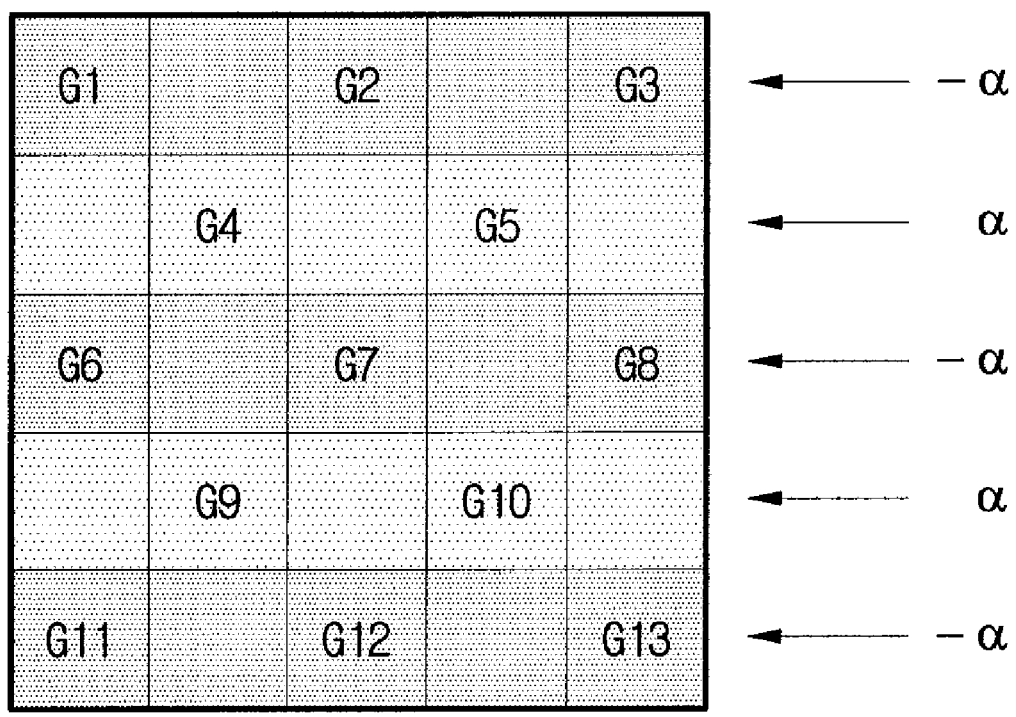
FIG. 6 illustrates how the correction unit shown in FIG. 4 performs correction.

FIG. 6 illustrates how the correction unit 450 of FIG. 4 performs correction.

As shown in the figure, the correction coefficient α is added to or subtracted from the green elements of the Bayer pattern image. As described earlier, subtraction is made to the odd number lines, and addition is made to the even number lines, when the correction coefficient is applied.

Figure 7:
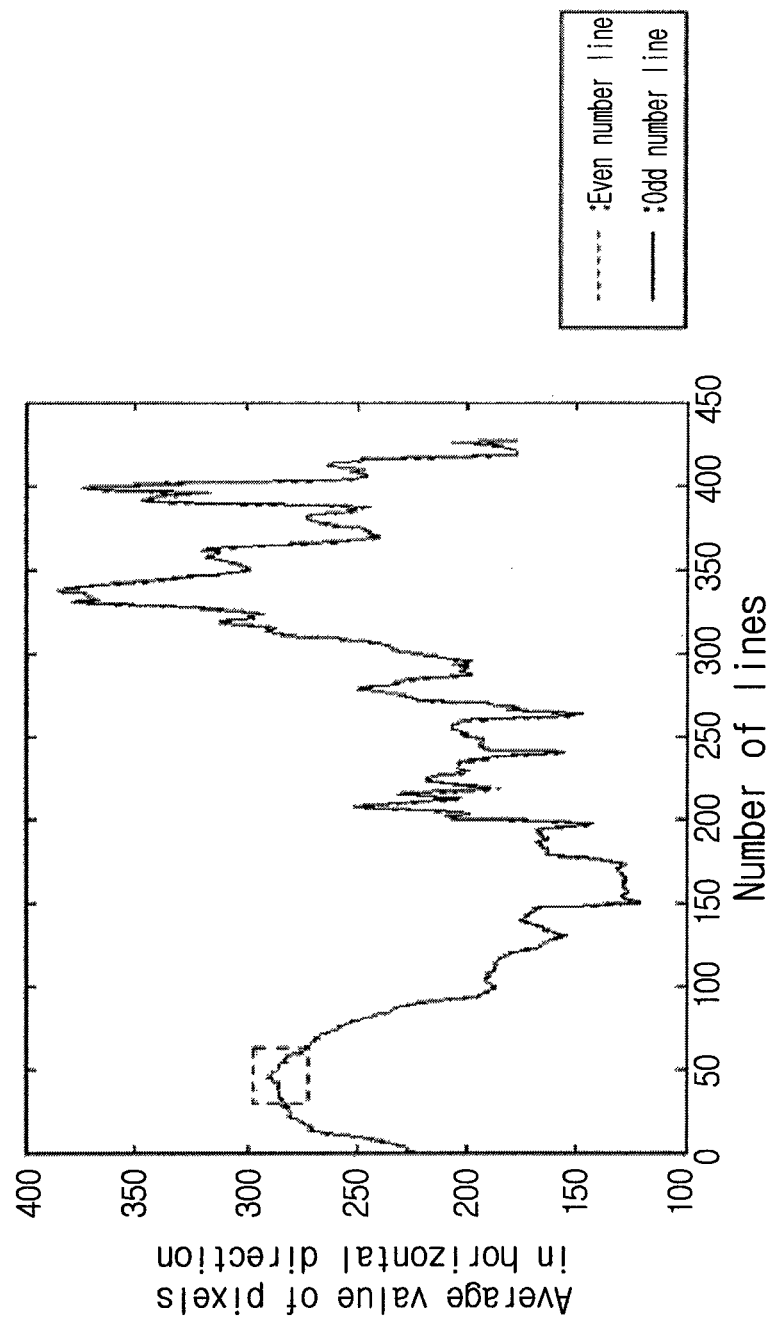
FIG. 7 shows a graph of average values of green pixels in the horizontal direction after grid noises are removed in accordance with an embodiment of the present invention.
Figure 8:
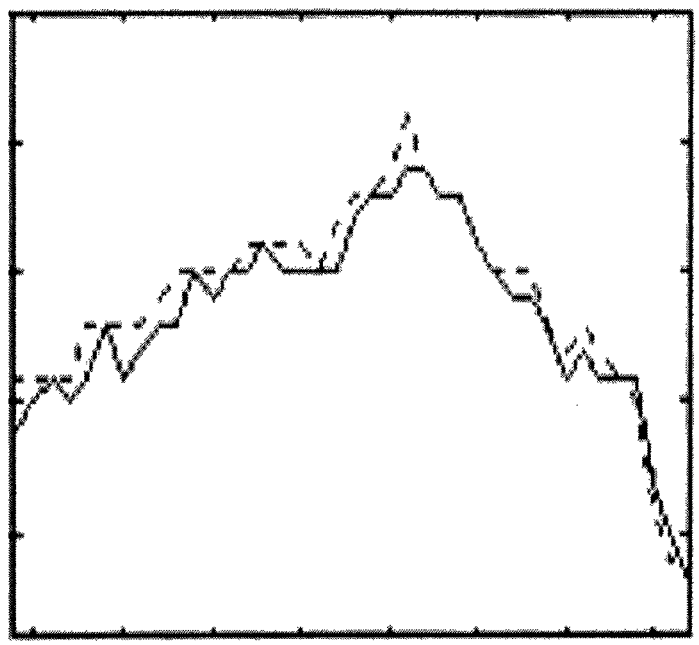
FIG. 8 shows an enlarged view of a section marked by dotted lines in FIG. 7.

FIG. 7 is a graph showing average values of green pixels in the horizontal direction after grid noises are removed in accordance with an embodiment of the present invention, and FIG. 8 shows an enlarged view of a section marked by dotted lines in FIG. 7;

As indicated in the figure, it can be seen that the differences in average values of pixels in the horizontal direction have become smaller, compared to FIG. 1.

Figure 9:
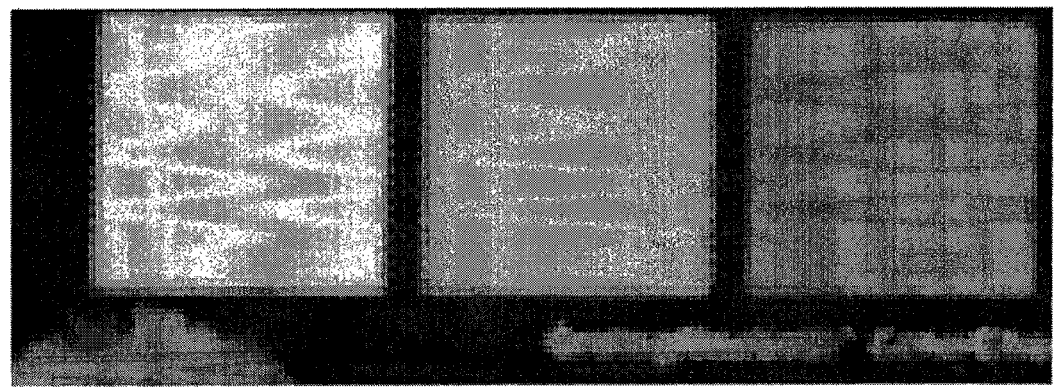
FIG. 9 shows an example of an image in which grid noises are removed in accordance with the present invention.

FIG. 9 is an example showing an image in which grid noises are removed in accordance with the present invention. As shown in the figure, it can be seen that the grid noises have been substantially removed, compared to the conventional image processing system, FIG. 10 is an example illustrated to show the optimization of correction coefficients obtained in accordance with the present invention. In this example, the correction coefficient α, obtained through the steps described above, is optimized for the system.

Although the 5×5 mask has been described as an example, the present invention is by no means restricted to 5×5 masks.

FIG. 11 shows an example of a correction coefficient obtained from a 6×6 mask in accordance with an embodiment of the present invention.

As shown in the figure, the device for removing grid noises in accordance with the present invention can remove the grid noises by obtaining a correction coefficient for an N×N mask and adding this correction coefficient to the green elements of an inputted image.

As described above, the present invention improves the conventional filter method of removing grid noises, by which details (e.g. edges or boundaries, which had a large number of high-frequency elements) of an image were also damaged, resulting in the deterioration of image quality. The present invention can remove grid noises without damaging details of an image by correcting and adjusting the differences between even number lines and odd number lines on the same line while maintaining the properties of the pixels of even number lines and odd number lines.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. A device for removing grid noises, comprising:
an average value calculation unit for calculating an average value of each line of an inputted Bayer pattern image;
an estimation unit for calculating an estimate value, the estimate value estimating an average of even number lines and odd number lines, the even number lines being placed between the odd number lines of the Bayer pattern image and the odd number lines being placed between the even number lines of the Bayer pattern image;
a difference calculation unit for calculating a difference value between the estimate value calculated by the estimation unit and the average value calculated by the average value calculation unit; and
a correction coefficient calculation unit for calculating a correction coefficient by using the difference value generated by the difference calculation unit,
wherein the correction coefficient is determined for each green element of the Bayer pattern image.

2. The device of claim 1, further comprising a correction unit for applying the correction coefficient to the Bayer pattern image and outputting a corrected Bayer pattern image.

3. The device of claim 1, wherein the difference calculation unit calculates a difference by subtracting the average value from the estimate value for the even number lines.

4. The device of claim 1, wherein the difference calculation unit calculates a difference by subtracting the estimate value from the average value for the odd number lines.

5. The device of claim 1, wherein the correction coefficient, obtained by the correction coefficient calculation unit, is an average of the difference value, calculated by the difference calculation unit, divided by two.

6. The device of claim 1, wherein the correction unit subtracts a correction coefficient of each green element from each green element of the Bayer pattern image for odd number lines.

7. The device of claim 1, wherein the correction unit adds a correction coefficient of each green element to each green element of the Bayer pattern image for even number lines.

8. A method of removing grid noises, comprising:
calculating an average value of each line of an inputted Bayer pattern image;
calculating an estimate value, the estimate value estimating an average of even number lines and odd number lines, the even number lines being placed between the odd number lines of the Bayer pattern image and the odd number lines being placed between the even number lines of the Bayer pattern image;
calculating a difference value between the estimate value and the average value;
calculating a correction coefficient by using the difference value; and
applying the correction coefficient to the Bayer pattern image and outputting a corrected Bayer pattern image,
wherein the correction coefficient is determined for each green element of the Bayer pattern image.

9. A device for removing grid noises, comprising:
an average value calculation unit for calculating an average value of each line of an inputted Bayer pattern image;
an estimation unit for calculating an estimate value, the estimate value estimating an average of even number lines and odd number lines, the even number lines being placed between the odd number lines of the Bayer pattern image and the odd number lines being placed between the even number lines of the Bayer pattern image;
a difference calculation unit for calculating a difference value between the estimate value calculated by the estimation unit and the average value calculated by the average value calculation unit; and
a correction coefficient calculation unit for calculating a correction coefficient by using the difference value generated by the difference calculation unit,
wherein the difference calculation unit calculates a difference by subtracting the average value from the estimate value for the even number lines, and
wherein the difference calculation unit calculates a difference by subtracting the estimate value from the average value for the odd number lines.

* * * * *